(12) United States Patent
Boileau

(10) Patent No.: US 12,473,096 B2
(45) Date of Patent: Nov. 18, 2025

(54) AIRCRAFT NACELLE AND ASSOCIATED AIR INTAKE

(71) Applicant: Safran Nacelles, Gonfreville L'Orcher (FR)

(72) Inventor: Patrick Boileau, Moissy Cramayel (FR)

(73) Assignee: Safran Nacelles, Gonfreville L'Orcher (FR)

( * ) Notice: Subject to any disclaimer, the term of this patent is extended or adjusted under 35 U.S.C. 154(b) by 1004 days.

(21) Appl. No.: 17/215,197

(22) Filed: Mar. 29, 2021

(65) Prior Publication Data

US 2021/0237891 A1 Aug. 5, 2021

Related U.S. Application Data

(63) Continuation of application No. PCT/FR2019/052295, filed on Sep. 27, 2019.

(30) Foreign Application Priority Data

Sep. 28, 2018 (FR) ...................................... 18/59000

(51) Int. Cl.
*B64D 33/02* (2006.01)
*B64D 29/08* (2006.01)
*F02C 7/04* (2006.01)

(52) U.S. Cl.
CPC ............. *B64D 33/02* (2013.01); *B64D 29/08* (2013.01); *F02C 7/04* (2013.01);
(Continued)

(58) Field of Classification Search
CPC ............................ B64D 29/08; F05D 2230/72
See application file for complete search history.

(56) References Cited

U.S. PATENT DOCUMENTS

2014/0294581 A1* 10/2014 Rivers ..................... B23P 15/04
  415/214.1
2015/0226231 A1* 8/2015 Murdock .............. F04D 29/403
  60/726

FOREIGN PATENT DOCUMENTS

EP 2628919 8/2013
FR 3044053 5/2017
(Continued)

OTHER PUBLICATIONS

Search Report issued in corresponding RU Application 2021109606/11, completed Dec. 15, 2022.
(Continued)

*Primary Examiner* — Nicholas McFall
*Assistant Examiner* — Eric Acosta
(74) *Attorney, Agent, or Firm* — Burris Law, PLLC

(57) ABSTRACT

An air intake for a nacelle of an aircraft propulsion assembly includes an upstream section that defines an air intake flow path, a central section surrounding a fan of an engine, and a downstream section surrounding a combustion chamber of the engine. The air intake includes a disassembly mechanism which has a panel able to move between a flush closed position in which the panel provides aerodynamic continuity of the air intake in the air intake flow path, and an open maintenance position in which the panel is radially and outwardly retracted in relation to its flush closed position in order to free up a space which allows removal of a blade of the fan at its distal end.

8 Claims, 7 Drawing Sheets

(52) U.S. Cl.
CPC ........... *B64D 2033/0273* (2013.01); *F05D 2220/323* (2013.01); *F05D 2230/72* (2013.01); *F05D 2260/30* (2013.01)

(56) References Cited

FOREIGN PATENT DOCUMENTS

| RU | 1766020 | 8/1994 | | |
|---|---|---|---|---|
| RU | 1059806 | 12/2004 | | |
| WO | WO-2014207409 A1 | * | 12/2014 | ............ B64D 29/06 |

OTHER PUBLICATIONS

International Search Report for International Application PCT/FR2019/052295, mailed Feb. 5, 2021.

* cited by examiner

AIRCRAFT NACELLE AND ASSOCIATED AIR INTAKE

CROSS-REFERENCE TO RELATED APPLICATIONS

This application is a continuation of International Application No. PCT/FR2019/052295, filed on Sep. 27, 2019, which claims priority to and the benefit of FR 18/59000 filed on Sep. 28, 2018. The disclosures of the above applications are incorporated herein by reference.

FIELD

The present disclosure relates to an aircraft nacelle and more specifically to an air intake of such a nacelle.

BACKGROUND

The statements in this section merely provide background information related to the present disclosure and may not constitute prior art.

An aircraft is propelled by one or more propulsion units comprising an engine housed in a tubular nacelle.

A nacelle generally has a tubular structure with a longitudinal axis comprising an air intake upstream of the engine, a median section intended to surround a fan of the turbojet engine, and a downstream section accommodating thrust reversal means and intended to surround the combustion chamber of the turbojet engine. The nacelle is generally terminated by an ejection nozzle whose outlet is located downstream of the turbojet engine.

The term "downstream" means the direction corresponding to the direction of the flow of cold air entering the turbojet. The term "upstream" designates the opposite direction.

The air intake comprises, on the one hand, an intake lip adapted to allow improved capture towards the turbojet engine of the air desired for the supply of the fan and of the inner compressors of the turbojet engine, and on the other hand, a downstream structure on which the lip is attached and intended to suitably channel the air towards the blades of the fan. The assembly is attached upstream to a fan casing belonging to the upstream section of the nacelle.

The fan comprises a blading which includes a plurality of blades. The role of the air intake is to capture the air intended to supply the turbojet engine, while providing improved air flow to an intake plane of the fan. It is in particular desired to decelerate the air flow up to the intake plane of the fan. To do this, the air intake includes an internal wall of curved shape extending longitudinally to the fan casing.

The nacelle also typically includes a top intended to receive an attachment pylon allowing the nacelle and the turbojet engine to be fastened to a wing of the aircraft or at the level of the fuselage. Each propulsion unit is thus attached to the aircraft by a mast generally located under a wing or at the level of the fuselage.

Modern nacelles are intended to accommodate a bypass turbojet engine capable of generating, via the blades of the rotating fan, a hot air flow (also called "primary flow") coming from the high pressure part of the turbojet engine, and a cold air flow ("secondary flow") which circulates outside the turbojet engine through an annular passage, also called "flow path".

Very high dilution aircraft engines for civil aviation may be associated with a relatively short air intake.

Examples of short air intakes are typically air intakes whose L/D ratio of their length L taken longitudinally on their internal diameter D corresponding to the diameter of the fan, is comprised between 0.5 and 0.25. Some known air intakes have an L/D ratio between 0.7 and 0.5 while some recent air intakes have an L/D ratio between 0.35 and 0.30 (see FIG. 1B).

The flow path created in this intake is then curved for the purpose of improving the engine supply in all attitudes of the aircraft. Indeed, the performance of the turbojet engine is directly linked to the quantity and quality of the air capture produced by the air intake.

The flow path also has a neck and therefore an evolution of section to further improve the engine supply.

All these geometric characteristics mean that it is not possible to have a cylindrical geometry of the nacelle in front of the engine of length guaranteeing the removal of the fan blades.

Indeed, the replacement of one or more fan blades must be carried out without any other disassembly than the engine parts (cone then blade). The disassembly depends on an axial kinematics equivalent to the length of the mortise embedding the foot of the fan blade.

At the distal end of the blade, namely the end opposite its foot, the surface of the facing flow path is desired to be cylindrical so as not to block this kinematics. Nonetheless, in the case of a relatively short air intake, the curvature of the flow path is closer to the fan and may make it difficult to disassemble the blades.

SUMMARY

This section provides a general summary of the disclosure and is not a comprehensive disclosure of its full scope or all of its features.

The present disclosure provides the use of an aerodynamically improved fan with the nacelle whose geometric shapes provide their aerodynamic function, while allowing simplified maintenance in the event of disassembly of the fan blades.

To this end, the present disclosure provides an air intake for a nacelle intended to equip an aircraft propulsion unit of the type comprising an air intake upstream of an engine delimiting an air intake flow path, a median section intended to surround a fan of the engine, and a downstream section intended to surround the combustion chamber of the engine. The air intake being advantageous in that it comprises a disassembly mechanism having a panel movable between a flush closed position in which it provides the aerodynamic continuity of the air intake in the air intake flow path and an open for maintenance position in which the panel is set back radially outwards with respect to its flush closed position so as to free up a space for the removal of a fan blade at its distal end.

Thanks to these characteristics, it is possible to remove a blade from the flow path in a practical way, without a neck formed by the air intake obstructing the maintenance maneuver. In fact, a displacement of the movable panel of the disassembly mechanism towards its open for maintenance position makes it possible to free up a space longitudinally facing a distal end of the concerned fan blade, and thus to increase the space desired for the maneuver without obstruction of the air intake.

The term "movable" panel means that the panel may be fully movable, by being linked or not to the structure of the air intake, or that at least one portion of this panel may be movable.

In one form, the movable panel is fixed to the nacelle by fixing means entirely housed in the nacelle, in particular in the air intake of the nacelle.

Such form makes it possible to improve the configuration of the air intake, particularly in terms of aerodynamics and ease of maintenance.

In another form, in the open for maintenance position, the movable panel is housed in the air intake of the nacelle in order to facilitate maintenance operations.

Advantageously, the means for fixing the movable panel to the nacelle are configured to guide the movable panel along a finite stroke between the flush closed position and the open for maintenance position. The stroke being delimited by retaining means such as stops. In other words, the fixing means comprise guide means making it possible to guide the stroke of the movable panel between its two extreme open and closed positions. The movable panel remains connected to the nacelle during this stroke between the stops.

According to yet another form, the fixing means are configured to allow the fixing of the movable panel to the nacelle between the flush closed position and the open for maintenance position. In other words, the disassembly mechanism is configured so that the movable panel remains continuously attached to the nacelle air intake regardless of its position. In particular, this improves the security of the device. Such form indeed allows the retention of the movable panel even in the event of subpar assembly.

According to yet another form, the movable panel is connected to the air intake by a plurality of fixing means. This further contributes to allowing the retention of the movable panel even in the event of subpar assembly.

In yet another form, the movable panel is movable in a radial translation.

In one form, the disassembly mechanism has a cavity formed in a thickness of the air intake and closed by the movable panel in the flush closed position, the fixing means comprising radial rods configured to be anchored to the movable panel and fixed at the air intake, which in one form is via a two-position movable yoke.

In another form, the disassembly mechanism has a cavity formed in a thickness of the air intake and closed by the movable panel in the flush closed position. The movable panel being formed of at least one flexible and deformable wall. In such form, this panel has a shape complementary to the cavity and has a hollow structure such as a cellular structure.

In yet another form, the movable yoke can be a two-position column fixing.

In yet another form, the two positions of the yokes placing the movable panel in its respective open for maintenance and closed positions, can be locked by locking means.

In one form, the present disclosure provides a nacelle for an aircraft propulsion unit, which is advantageous in that it comprises an air intake comprising all or part of the aforementioned characteristics.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
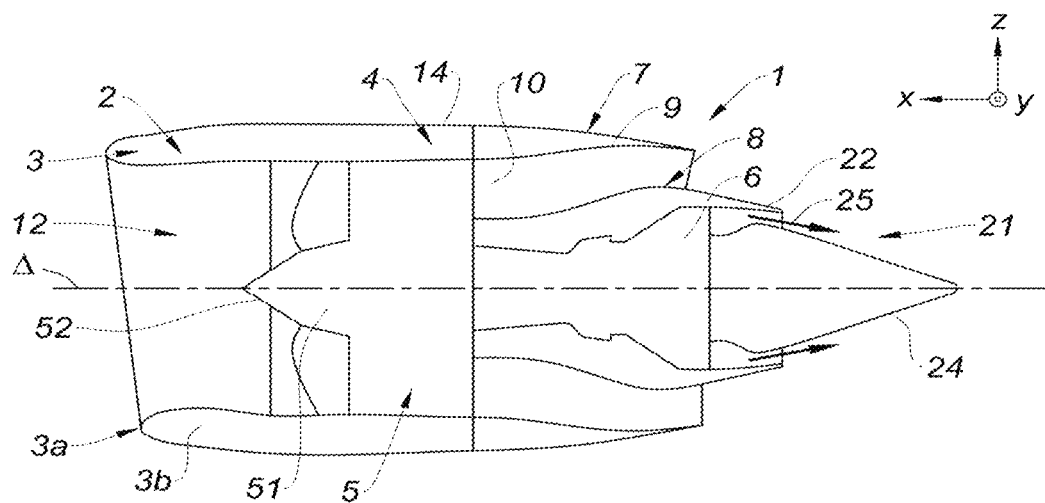
FIG. 1A is a schematic view of a nacelle according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all of these figures, identical or similar references designate identical or similar organs or sets of organs.

As represented in FIG. 1A, a nacelle 1 according to the present disclosure has a substantially tubular shape along a longitudinal axis A (direction parallel to X).

The nacelle 1 comprises an upstream section 2 with an air intake lip 3a, a median section 4 surrounding a fan 5 of a turbojet engine 6 such as a bypass turbojet engine, and a downstream section 7 accommodating a thrust reversal system (not shown). The nacelle serves to channel the air flow generated by the turbojet engine 6.

The air intake 3 is divided into two parts, namely on the one hand, an intake lip 3a adapted to allow improved capture towards the turbojet engine of the air desired to supply the fan and the inner compressors of the turbojet engine, and on the other hand, a downstream structure 3b on which the lip 3a is attached and intended to properly channel the air towards the fan blades. The assembly is attached upstream of a fan casing belonging to the median section 4 of the nacelle 1.

The downstream section 7 comprises for its part an inner structure 8 (also called "inner fixed structure" or "IFS") surrounding the upstream portion of the turbojet engine 6, an outer structure (also called "outer fixed structure" or "OFS")

9 and a movable cowl comprising thrust reversal means. The inner structure or IFS 8 as well as the outer structure or OFS 9 are fixed relative to the movable cowl.

The IFS 8 and OFS 9 delimits a flow path 10 allowing the passage of an air flow penetrating the nacelle 1 at the level of the air intake lip 3a.

The nacelle 1 includes a top 14 intended to receive an attachment pylon 16 making it possible to fix said nacelle 1 to a wing of the aircraft. To do this, said top 14 includes means for fixing said pylon 16.

The turbojet engine nacelle is in particular suspended from the pylon 16, by means of a beam 11 at the level of this top 14.

The nacelle 1 ends with an ejection nozzle 21 comprising an outer module 22 and an inner module 24. The inner and outer modules 24, 22 define a flow channel of the primary air flow 25, called hot air, leaving the turbojet engine 6.

Figure 2:
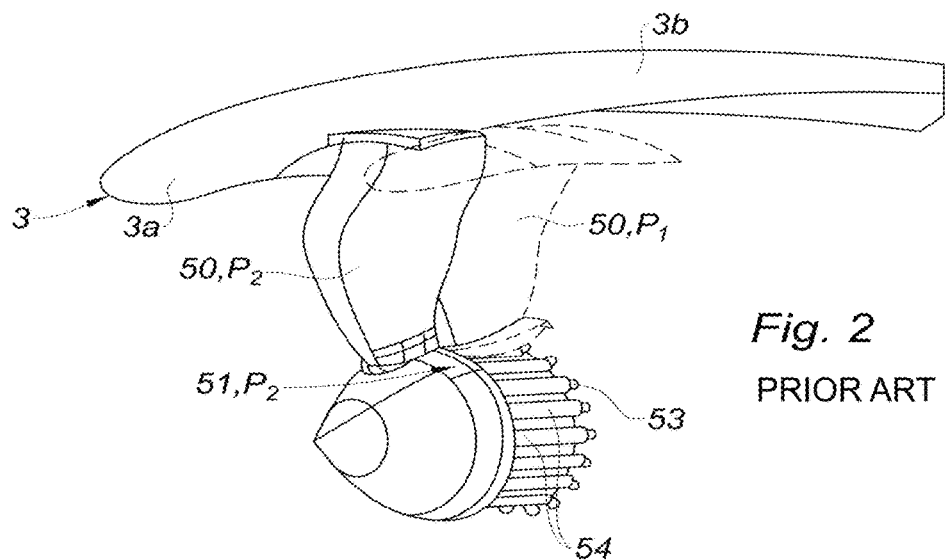
FIG. 2 is a schematic perspective view of a fan blade during its removal for maintenance, according to the prior art.

As represented more specifically in FIG. 2 illustrating the prior art, the disassembly of a blade 50 from the fan 5 is dependent on an axial kinematics equivalent to the length of the mortise embedding the foot of the fan blade. On a short air intake, the lines can affect this disassembly.

Figure 1B:
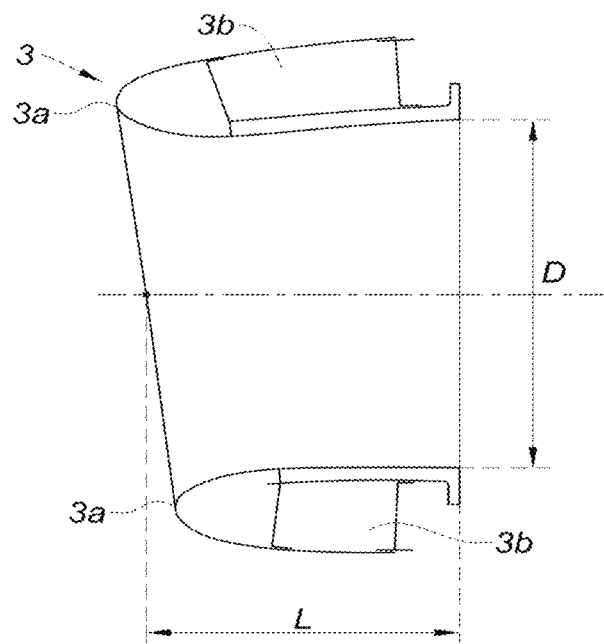
FIG. 1B is a schematic view of an air intake of a nacelle.

Examples of short air intake are typically air intakes whose ratio of their length L taken longitudinally to their internal diameter D corresponding to the diameter of the flow path where the air circulates, is comprised between 0.5 and 0.25 (see FIG. 1B).

More precisely, the fan 5 of the turbojet engine includes a rotary disc 52 whose periphery includes a plurality of cells. The blades 50 of the fan each include an attachment 53 located at a first end, also called the feet. This attachment 53 is housed in one of the cells 54 of the disc 52. The attachment of a conventional blade 50 is generally rectilinear, but there are also blades 50 with a curvilinear attachment having a curvature in a plane tangent to the periphery of the disc 52.

To deposit a blade 50 of the fan 5 in a conventional manner, a cone 51 located upstream of the disc 52 of the fan 5 is previously disassembled.

Then, a wedge disposed in the cell 54 of the disc 52, between the attachment 53 of the blade 50 and the bottom of the cell 54, is removed.

The blade 50 is then displaced radially by a certain height permitted by the removal of the wedge, then the blade 50 is released from the cell 54 by sliding the attachment 53 longitudinally in the cell 54 from a position P1 to a position P2 (see FIG. 2). In this way, the blade 50 is deposited passing through the air intake 3 without coming into contact with the latter.

However, the trend is currently towards an increase in the rate of dilution of bypass turbojet engines, also called BPR for "By-Pass Ratio". The dilution rate corresponds to the ratio between the flow rate of the secondary flow and the flow rate of the primary air flow in the turbojet engine.

To increase the dilution rate, the diameter of the nacelle is increased, which represents drawbacks such as an increase in the mass and drag of the nacelle. The design of the nacelle is then revised to reduce the impact of these drawbacks. For this purpose, the length of the air intake is reduced. This is then referred to as a "short" air intake.

Despite a reduced length, it is desired for the air intake 3 to retain the same capabilities to provide improved air flow to the intake plane of the flow path. For this, the internal wall 30 of the air intake 3 further penetrates under the casing surrounding the fan.

In this configuration, the internal wall 30 inhibits the removal of a blade 50 from the fan. Indeed, the space is insufficient to completely free the attachment 53 of the blade 50 from the cell 54 of the disc 52. The blade 50 comes into contact with the internal wall 30, in particular at its distal end 55 opposite to the feet forming attachment 53, before it can be completely withdrawn. It is then desired to remove the air intake 3 from the nacelle 1 so that the blade 50 can be longitudinally released.

Nonetheless, this solution has the drawback of consuming an enormous amount of time due to the presence of numerous devices in the air intake 3 of the nacelle, for example defrosting systems.

Figure 3:
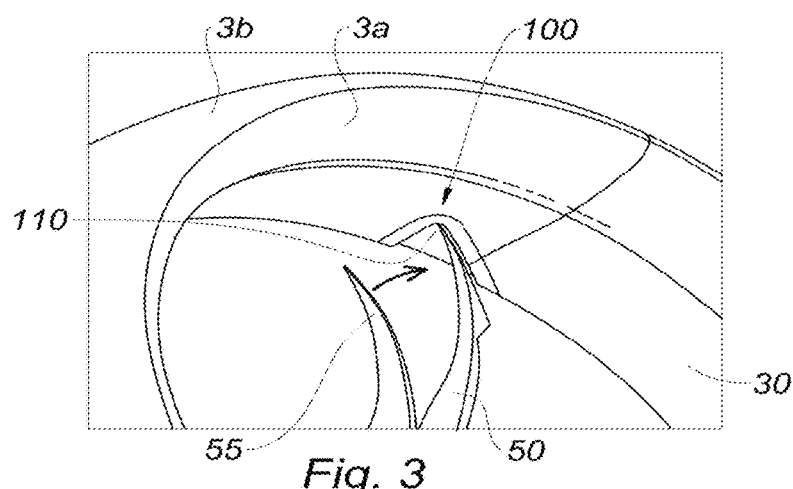
FIG. 3 is a schematic view of an air intake provided with a disassembly mechanism according to the principles of the present disclosure.

FIG. 3 illustrates a partial view of an air intake provided with a disassembly mechanism according to one form of the present disclosure, making it possible to overcome the drawbacks of the prior art.

In this form, the air intake 3 according to the present disclosure comprises a disassembly mechanism 100 provided with a movable panel 110.

This panel 110 is movable between a flush closed position in which it provides the aerodynamic continuity of the air intake 3 in the air intake flow path, this is an in-flight position for example, and an open for maintenance position in which the panel 110 is set back radially outwards with respect to its flush closed position so as to free a space 120 allowing the removal of a fan blade 50 at its distal end 55.

The disassembly mechanism 100 has a cavity 140 formed in a thickness of the air intake 3, that is to say that it extends radially in the structure of the nacelle 1 delimiting the air intake flow path.

This cavity 140, in the closed position, is closed by the movable panel 110 allowing the flow of air circulating in the flow path to impact the internal wall 30 of the air intake 3 and the movable panel 110 which is flush with it continuously and unobstructed up to the fan 5.

During maintenance, the panel 110 is displaced, in particular retracted, so as to enter the structure of the air intake 3 of the nacelle itself. This makes it possible to increase a space of sufficient volume to handle a blade 50 of the fan located radially to the right of this space. This space is in particular formed by the cavity 140 which is then open towards the flow path of the flow.

FIG. 3 illustrates an open position of the cavity 140 in which the movable panel 110 is retracted into the open for maintenance position. The volume then opened makes it possible to move the blade 50 of the fan 5 (following the arrow illustrated in this FIG. 3) without encountering an obstacle by being moved towards the front of the nacelle 1.

For structural and practical reasons, such a disassembly mechanism 100 is not provided around the entire periphery of the nacelle 1.

Figure 4:
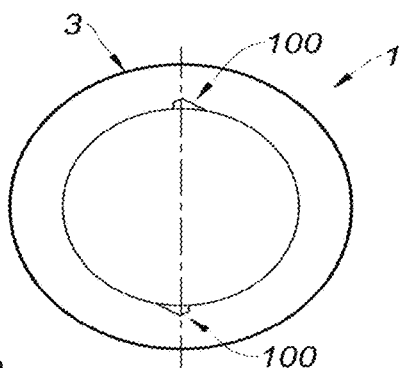
FIG. 4 is a cross-sectional view of an alternate nacelle including an air intake provided with a plurality of disassembly mechanisms.

The nacelle may include only one disassembly mechanism 100 or even several. With reference to FIG. 4, and according to an advantageous form, the air intake 3 of the nacelle includes two disassembly mechanisms 100 disposed diametrically opposed with respect to the nacelle relative to each other, that is to say symmetrically with respect to the longitudinal axis of the nacelle.

More particularly, as illustrated in detail in FIG. 4, these two disassembly mechanisms 100 are positioned in angular positions respectively greater than 12 o'clock and less than 6 o'clock.

The fact that these disassembly mechanisms 100 are diametrically opposed and at these two positions greater than 12 o'clock and less than 6 o'clock makes it possible to facilitate maintenance by allowing two blades 50 to be withdrawn more easily both concomitantly and without hindrance between them.

Figure 5A:
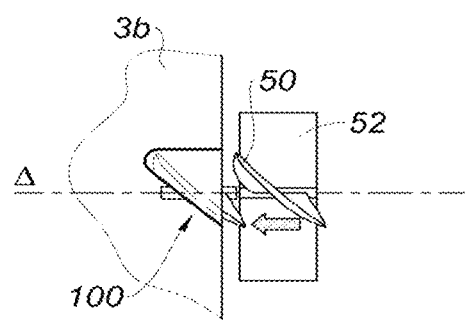
FIGS. 5A and 5B are top views of an alternate air intake illustrating disassembly mechanisms.
Figure 5B:
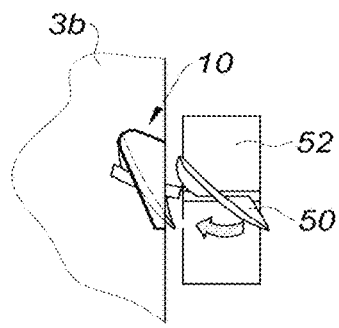

Such a disassembly mechanism 100 can be used whatever the type of attachment 53 of the blades 50, whether it is rectilinear (see FIG. 5A) or curvilinear (see FIG. 5B), that is to say having a curvature in a plane tangent to the periphery of the disc 52. FIGS. 5A and 5B illustrate partial views of a disassembly mechanism 100 located in the upper angular position 12 o'clock and seen from above during a withdrawal movement of a blade 50.

The movable panel 110 is fixed to the nacelle 1 by fixing means or fasteners 130 housed entirely in the nacelle 1 (not visible in FIGS. 3 to 7) and in particular in the air intake 3 of the nacelle 1.

Figure 7A:
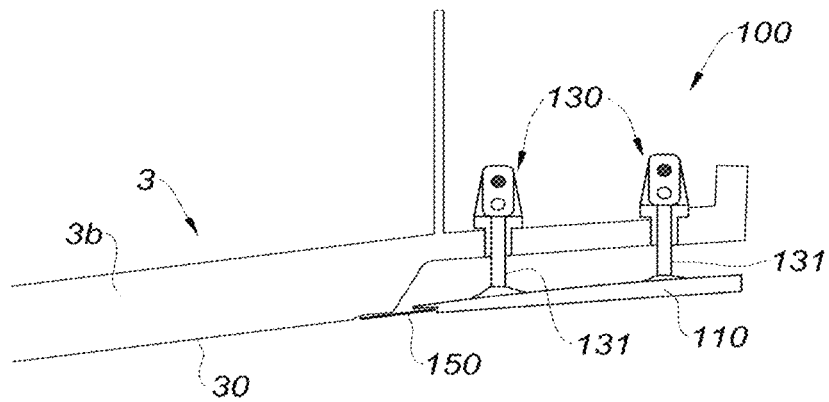
FIGS. 7A and 7B are cross-sectional views of another disassembly mechanism in the flush closed and open for maintenance positions.
Figure 7B:
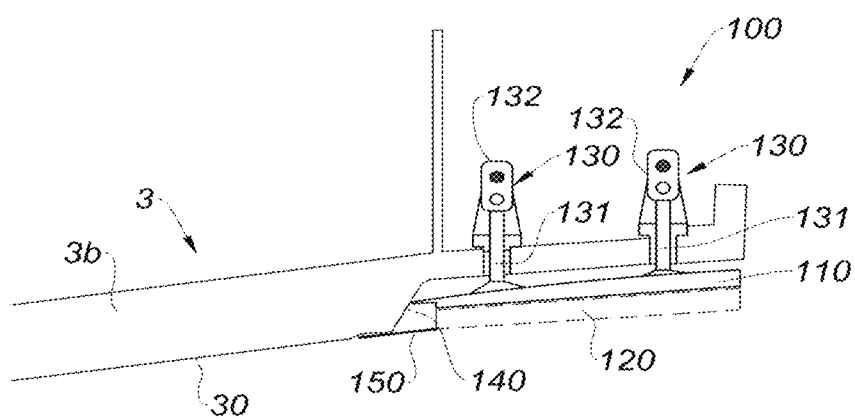
Figure 7C:
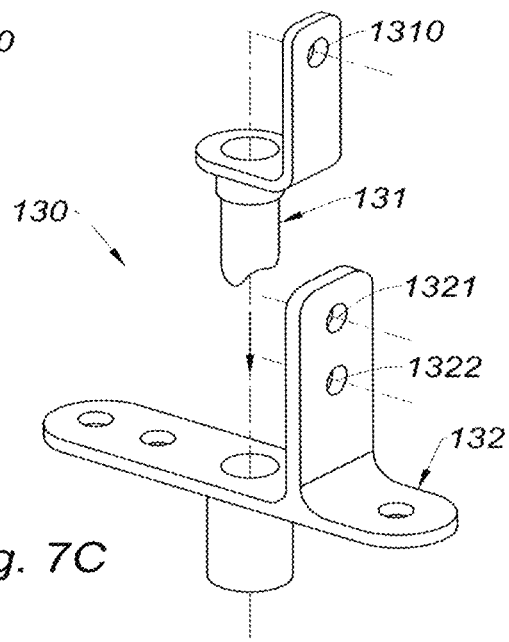
FIG. 7C is a schematic perspective view of a means for fixing a movable panel of a disassembly mechanism that can be implemented in the configuration of FIGS. 7A and 7B.

The fixing means 130 are detailed more specifically with reference to FIGS. 7A and 7B.

Figure 6A:
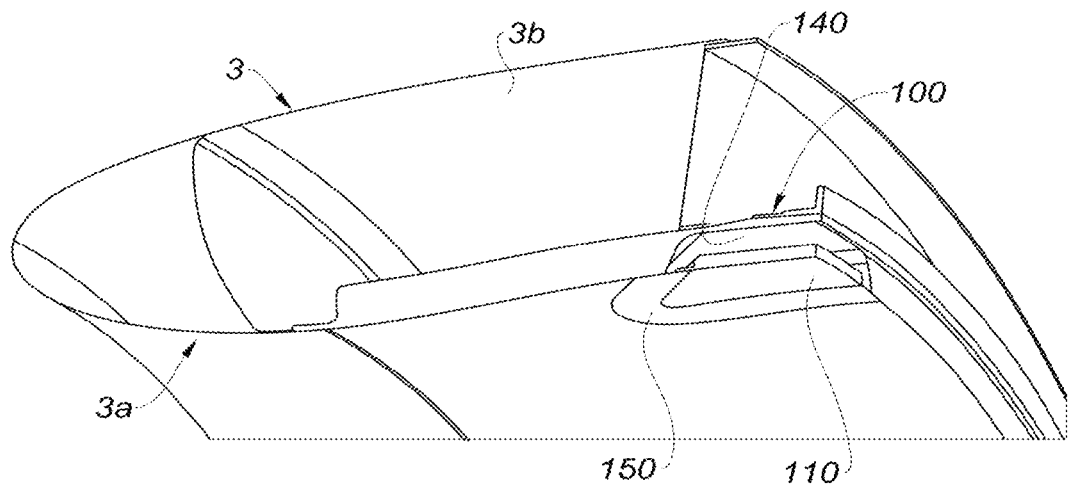
FIGS. 6A and 6B are schematic perspective views of an alternate air intake provided with a disassembly mechanism in the flush closed and open for maintenance positions.
Figure 6B:
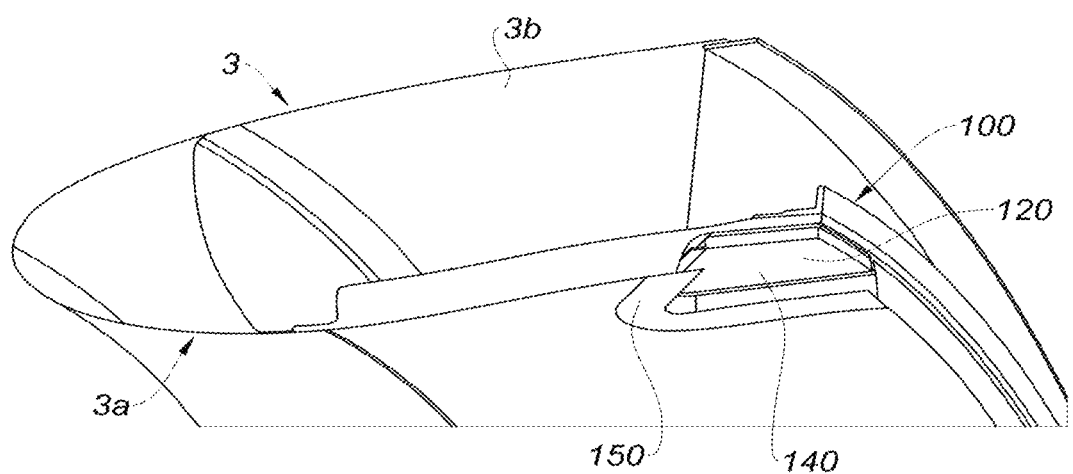

FIGS. 6A and 6B illustrate partial views of an air intake 3 provided with a disassembly mechanism 100 in the flush closed and open for maintenance positions. To improve the readability of these figures, the fixing means 130 are not represented.

FIGS. 7A and 7B illustrate sectional views of a disassembly mechanism 100 according to another form in the flush closed and open for maintenance positions.

In the flush closed position, the panel 110 is flush with the internal wall 30 of the air intake 3 so that it provides the aerodynamic continuity of the air intake 3 in the air intake flow path.

In the open for maintenance position, the movable panel 110 enters the cavity 140 and is housed inside the structure of the air intake 3 of the nacelle 1. The thickness of its structure being locally reduced to form this cavity 140. Such a cavity has relatively small dimensions so that the structural strength of the air intake is not affected.

The useful depth of the cavity 140 varies according to the volume desired to provide the disassembly kinematics. By way of example, a disassembly provided by a radial translation of the panel of 10 mm for an air intake in the shape of a barrel with a thickness equal to 40 mm could be selected, which also makes it possible to conserve material in the barrel ensuring structural strength while housing therein the fixing system of the movable panel 110. In the form of FIGS. 7A and 7B, the fixing means 130 comprise radial rods 131 anchored to the movable panel 110 on the side opposite to its suitable surface to be impacted by the air flow. These rods are also attached to the air intake 3, in particular by means of a yoke 132 movable at two positions.

The rods 131 pass through the internal wall 30 of the air intake 3 and are guided by them in translation, radially relative to the longitudinal axis of the nacelle 1.

The displacement of the yokes 132 from a first position to a second position allows displacing the movable panel 110 from its closed position to its open position. The translation of the rods radially causes the sliding of the movable panel 110 in a radial translation. During this movement, the movable panel 110 enters the cavity 140, towards a bottom thereof and frees a space 120 used for the maintenance of the blades 50 freeing any obstacle liable to interfere with handling.

These means for fixing the movable panel 110 to the nacelle 1 are configured to guide the movable panel 110 along a finite stroke between the flush closed position and the open for maintenance position. In this form, it is the two positions of the movable yokes 132 which are limited and delimit this stroke.

The yokes 132 being rigidly fixed to the internal wall 30 of the air intake 3 on the one hand and the movable panel being rigidly fixed to the rods 131 on the other hand, in addition to the fact that the yokes are movable. It follows that the fixing of the movable panel 110 to the nacelle 1 between the flush closed position and the open for maintenance position is advantageous whatever the position of the movable panel 110. Such fixing can be provided by a fixing with two positions columns, as illustrated for example in FIG. 7C.

The fixing means 130 comprise retaining means delimiting the stroke at the level of these two extreme positions, namely the closed and open positions, which form stops (not illustrated).

In one form, the two positions of the yokes 132 placing the movable panel 110 in its respective open for maintenance and closed positions, can be locked by locking means or a locking device. These locking means may for example comprise a pin (not illustrated) which is inserted in an orifice 1310 of a rod 131 and in an orifice 1321 or 1322 of a fixed portion of the yoke 132 relative to the internal wall 30 of the air intake 3, when these orifices are aligned. Once the pin has been inserted into these orifices, the closed or open position is then locked.

The air intake 3 comprises a threshold 150 at the interface between the wall of the movable panel 110 lapped by the air flow and the internal wall 30 of the air intake 3 which is flush with it.

Such a threshold 150 mainly participates in the retention of the movable panel 110 in the closed position while ensuring its maintenance and forming a stop, and also participates in reducing the pressure losses possibly created between these two parts during its use.

This allows avoiding, in the event of improper assembly, the risk of ingestion of parts in the engine, unlike a hinged hatch which, if it were to open, will be torn off.

Such form is particularly advantageous in that it makes it possible to enter the structure of the air intake 3 in the open position. It is neither articulated by a hinge which could present constraints in operation, nor fixedly attached which would desire the prior removal of the part disengaged from the air intake.

In this form, the movable panel is held to the structure of the air intake 3 regardless of its position.

Such a movable panel 110 is dimensioned as closely as possible for the disassembly volume of the blade 50, so as to impact as little as possible the acoustic surface of the air intake, which can be retracted (recessed) for said disassembly. It is captive due to a double retention means, an aerodynamic threshold 150 inhibiting the panel from protruding into the flow path and fixing means 130 forming a holding system passing through the structure of the air intake 3 in the shape of a substantially barrel, which provides the maintenance in position and in safety of said panel.

Figure 8A:
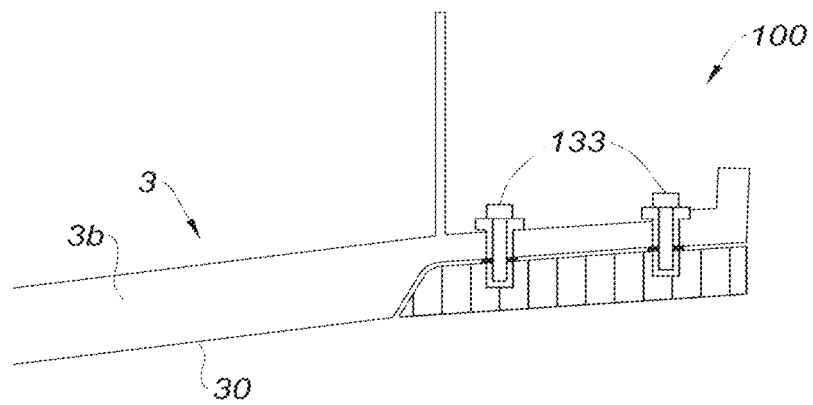
FIGS. 8A and 8B are cross-sectional views of another disassembly mechanism in the flush closed and open for maintenance positions.
Figure 8B:
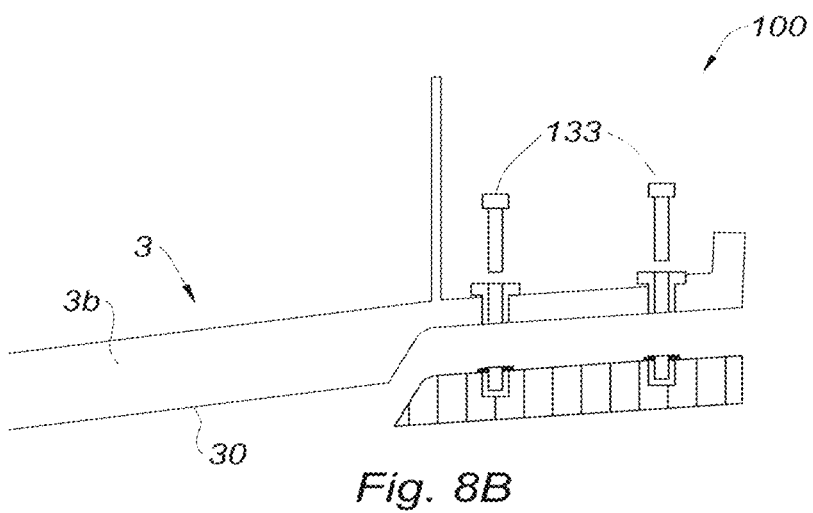

FIGS. 8A and 8B illustrate sectional views of a disassembly mechanism 100 according to another form in the flush closed and open for maintenance positions.

This form differs from that illustrated in FIGS. 7A and 7B in that the movable panel 110 is here configured to have a volume complementary to that delimited by the cavity 140 corresponding to the space 120.

The fixing means 130 are further removable, comprising in particular sets of screws 133 allowing the movable panel 110 to be fixed to the internal wall 30 of the air intake 3.

These screws 133 have a head on the side of the internal wall 30 opposite to the air intake flow path forming a retention stop, passes through the internal wall 30 and has anchoring feet which are anchored in the inserts located in the movable panel 110. The inserts comprise an internal thread provided to receive the thread of the screw. The internal wall 30 of the air intake 3 locally forming the bottom of the cavity 140 is therefore gripped between the heads of the screws 133 on the one hand and the movable panel 110 on the other hand.

In such form, the operating movable panel must remove the movable panel before removing the blades 50.

Figure 9A:
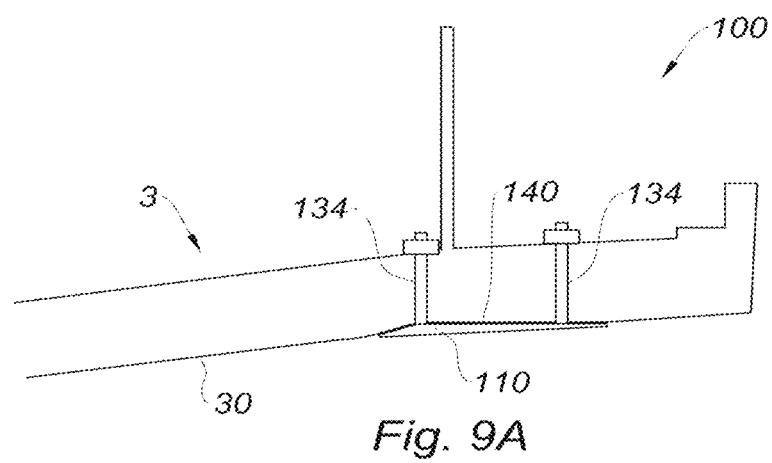
FIGS. 9A and 9B are cross-sectional views of yet another disassembly mechanism in the flush closed and open for maintenance positions.
Figure 9B:
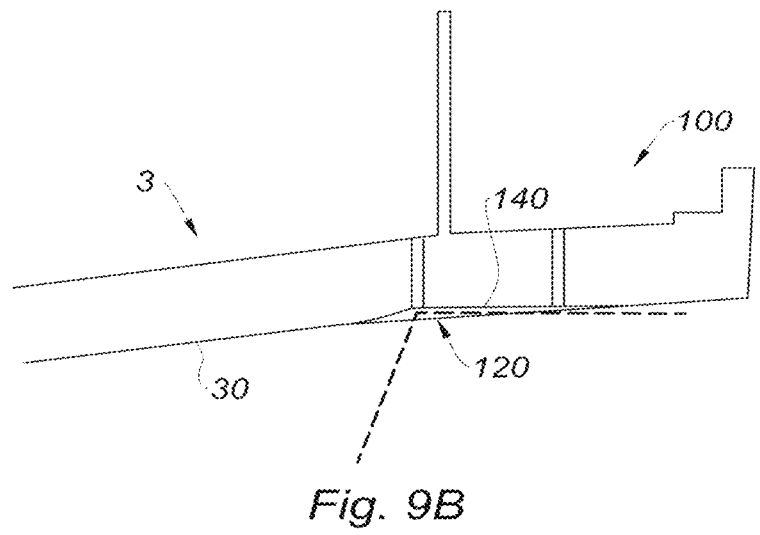

FIGS. 9A and 9B illustrate sectional views of a disassembly mechanism 100 according to another form in the flush closed and open for maintenance positions.

This form differs from the previous forms illustrated in FIGS. 8A and 8B in that the cavity 140 is smaller as regards its volume, the latter depending on the dimensions of the air intake 3 of the nacelle 1 and the configuration of the fan 5.

Moreover, the movable panel 110 is formed of a fairing fixed by fixing means 130 comprising through tie rods 134 fixed to the internal wall 30 of the air intake 3 and secured to said fairing.

A dotted line in FIG. 9B schematizes the path taken by a distal end of a blade 50 of the fan 5 indicating its withdrawal.

Figure 10A:
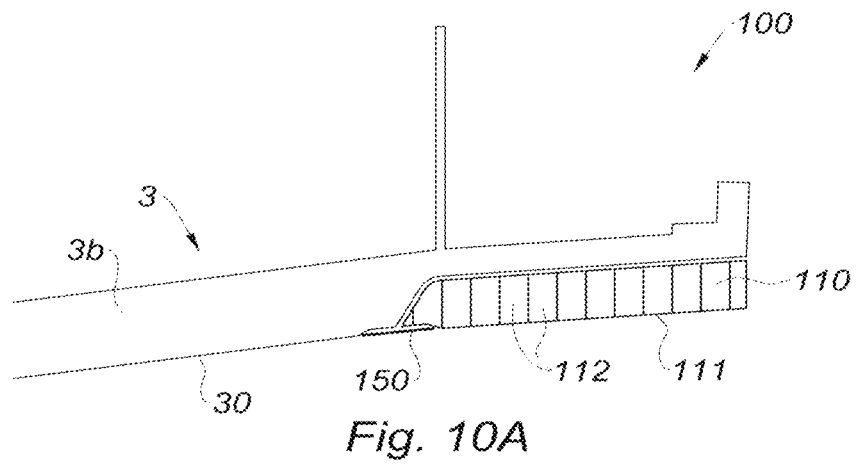
FIGS. 10A and 10B are cross-sectional views of yet another disassembly mechanism in the flush closed and open for maintenance positions.
Figure 10B:
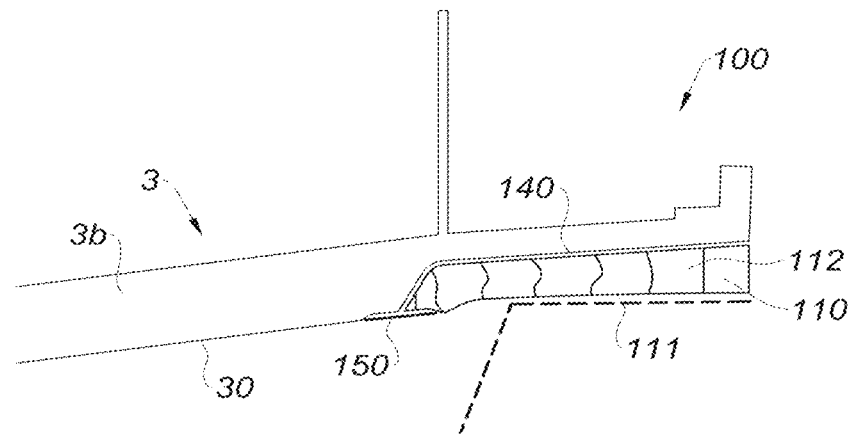

FIGS. 10A and 10B illustrate sectional views of a disassembly mechanism 100 according to another form in the flush closed and open for maintenance positions.

This form differs from the previous ones in that the disassembly mechanism 100 has a cavity formed in the thickness of the air intake 3 and closed by the movable panel 110 in the flush closed position, the movable panel 110 being formed of at least one flexible and deformable wall.

In this form, the movable panel 110 has a volume complementary to that delimited by the cavity 140. A deformation of the movable panel 110 then makes it possible to free up a space 120.

This movable panel 110 is here made of an elastomeric material, embedded and glued inside the cavity 140.

In order to provide sufficient deformation during maintenance and a rigidity and structural strength appropriate to the forces undergone locally by the movable panel 110, said movable panel 110 has a hollow structure, which in one form is a cellular structure, that is to say provided with cells 112. Acoustic treatment of the movable panel can be considered.

The deformation of at least one lower wall of the movable panel impacted by the air flow in the closed position is then configured to be deformed towards the inside of the movable panel 110, that is to say radially towards the exterior with respect to its position flush with the internal wall 30 of the air intake 3 in the closed position so as to free a space 120 allowing the removal of a blade 50 of the fan 5. This deformation can be carried out for example by means of a tool by an operator.

In this mechanism, it is therefore a part of the movable panel which is intended to be movable between the open and closed positions, the panel having a base embedded and glued in the cavity 140, whose deformations are negligible.

Such a disassembly mechanism 100 has the advantage of not having to be disassembled beforehand by an operator, as is the case for the form illustrated in FIGS. 8A and 8B.

A dotted line in FIG. 10B schematically shows the path taken by a distal end of a blade 50 of the fan 5 indicating its withdrawal.

In an alternative or complementary configuration, it can be envisioned that the panel 110 is pressurized in operation and deflated during maintenance in order to reduce its volume. Such form makes it possible to avoid the use of tools.

In this case, the movable panel 110 has a hollow structure, for example a cellular structure, and further has pressure balancing vents.

These balancing vents may include, for example, at least one bore per cell either in the partitions separating the cells, or on the outside, that is to say in a wall between the hollow portion and the outside. In any event, such a configuration desires at least one bore on the flow path side to balance the cavities, that is to say at least one bore in the lower wall of the movable panel 110 intended to be impacted by the air flow in the closed position. An advantageous configuration in this case is a combination of the two possibilities (internal drilling(s) between partitions and external drilling(s)) by reducing the impact of the drag of the bores and improving the need for drainage of the cells thus open to the outside.

Whatever the configuration of the movable panel 110, the air intake 3 may have a threshold 150 at the interface between the wall of the movable panel 110 licked by the air flow and the internal wall 30 of the air intake 3 which is flush with it, this in a manner similar to the aerodynamic threshold described with reference to FIGS. 7A and 7B (see for example FIGS. 10A and 10B).

The present disclosure is described in the foregoing by way of example. It is understood that one skilled in the art is able to carry out different variations of the present disclosure without however departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An air intake for a nacelle of an aircraft propulsion unit comprising an upstream section defining an air intake flow path, a median section surrounding a fan of an engine, and a downstream section surrounding a combustion chamber of the engine, the air intake comprising:
   a disassembly mechanism having a panel moveable between a flush closed position in which the panel provides aerodynamic continuity of the air intake in the air intake flow path and an open position for maintenance in which the panel is recessed radially outward from its flush closed position so as to free a space allowing removal of a fan blade at its distal end, the disassembly mechanism also having a cavity formed in a thickness of the air intake and closed by the panel in the flush closed position; and
   a fastener fixing the panel to the nacelle and configured to be housed entirely in the air intake of the nacelle,
   wherein the fastener includes radial rods configured to be anchored to the panel and fixed to the air intake by a yoke moveable in a first position and a second position.

2. The air intake according to claim 1, wherein, in the open for maintenance position, the movable panel is housed in the air intake of the nacelle.

3. The air intake according to claim 1, wherein the fastener is configured to guide the movable panel along a finite stroke between the flush closed position and the open for maintenance position, the finite stroke being defined by stops.

4. The air intake according to claim 1, wherein the fastener is configured to provide the fixing of the movable panel to the nacelle between the flush closed position and the open for maintenance position.

5. The air intake according to claim 1, wherein the movable panel is movable in a radial translation.

6. The air intake according to claim 1, wherein the yoke is a two-position column fixing.

7. The air intake according to claim 1, wherein, when the yoke is in the first position, the movable panel is in the flush closed position, and when the yoke is in the second position, the movable panel is in the open for maintenance position, the yoke is locked by a locking device.

8. An air intake for a nacelle of an aircraft propulsion unit comprising an upstream section defining an air intake flow path, a median section surrounding a fan of an engine, and a downstream section surrounding a combustion chamber of the engine, the air intake comprising:
- a disassembly mechanism having a panel moveable between a flush closed position in which the panel provides aerodynamic continuity of the air intake in the air intake flow path and an open position for maintenance in which the panel is recessed radially outward from its flush closed position so as to free a space allowing removal of a fan blade at its distal end, the disassembly mechanism also having a cavity formed in a thickness of the air intake and closed by the panel in the flush closed position;
- a fastener fixing the panel to the nacelle and configured to be housed entirely in the air intake of the nacelle; and
- a pair of yokes coupled to the air intake,
- wherein the fastener includes radial rods configured to be anchored to the panel and fixed to the air intake by the pair of yokes.

* * * * *